(12) United States Patent
Zars et al.

(10) Patent No.: US 9,260,878 B2
(45) Date of Patent: Feb. 16, 2016

(54) ENLARGED POOL FILTERING SYSTEM WITH SKIMMER AND PRE-FILTER

(71) Applicants: Keith Zars, San Antonio, TX (US); Olaf Mjelde, San Diego, CA (US)

(72) Inventors: Keith Zars, San Antonio, TX (US); Olaf Mjelde, San Diego, CA (US)

(*) Notice: Subject to any disclaimer, the term of this patent is extended or adjusted under 35 U.S.C. 154(b) by 238 days.

(21) Appl. No.: 14/023,771

(22) Filed: Sep. 11, 2013

(65) Prior Publication Data
US 2015/0068961 A1    Mar. 12, 2015

(51) Int. Cl.
*E04H 4/12*    (2006.01)
*C02F 1/78*    (2006.01)

(52) U.S. Cl.
CPC ............... *E04H 4/1272* (2013.01); *C02F 1/78* (2013.01)

(58) Field of Classification Search
CPC .................................. E04H 4/1272; C02F 1/78
USPC ........................ 210/167.11, 167.12, 167.19
See application file for complete search history.

(56) References Cited

U.S. PATENT DOCUMENTS

| | | | | |
|---|---|---|---|---|
| 3,212,268 A * | 10/1965 | Ortega | ............................. | 405/60 |
| 3,616,916 A * | 11/1971 | Greene | .......................... | 210/121 |
| 4,454,035 A * | 6/1984 | Stefan | ............................ | 210/117 |
| 2002/0117432 A1* | 8/2002 | Lincke | ........................... | 210/169 |
| 2004/0104163 A1* | 6/2004 | Leaverton | ..................... | 210/448 |

* cited by examiner

*Primary Examiner* — Fred Prince
(74) *Attorney, Agent, or Firm* — Robert J. Lauson; Lauson & Tarver, LLP

(57) ABSTRACT

The present pool filtering system provides an elongated fine mesh filter with a large surface area; which can be removed and inserted through a standard filter access port found on pool decks. Because the filter assembly length is at least twice the diameter measurement, a large surface area is possible while remaining compact. The filter assembly includes a cylindrical porous filter basket that is completely lined with a filter bag. The filter bag can filter particulate matter as fine as three hundred microns or less. The present filtering system can provide preliminary filtering before water is delivered for further conditioning by secondary filters, heater, or the like. The present filter permits fine filtering without constant clogging or maintenance. When maintenance is required, there is easy access for cleaning and replacement. The elongated weir housing and weir door allows for a greater operating range of pool water level.

14 Claims, 8 Drawing Sheets

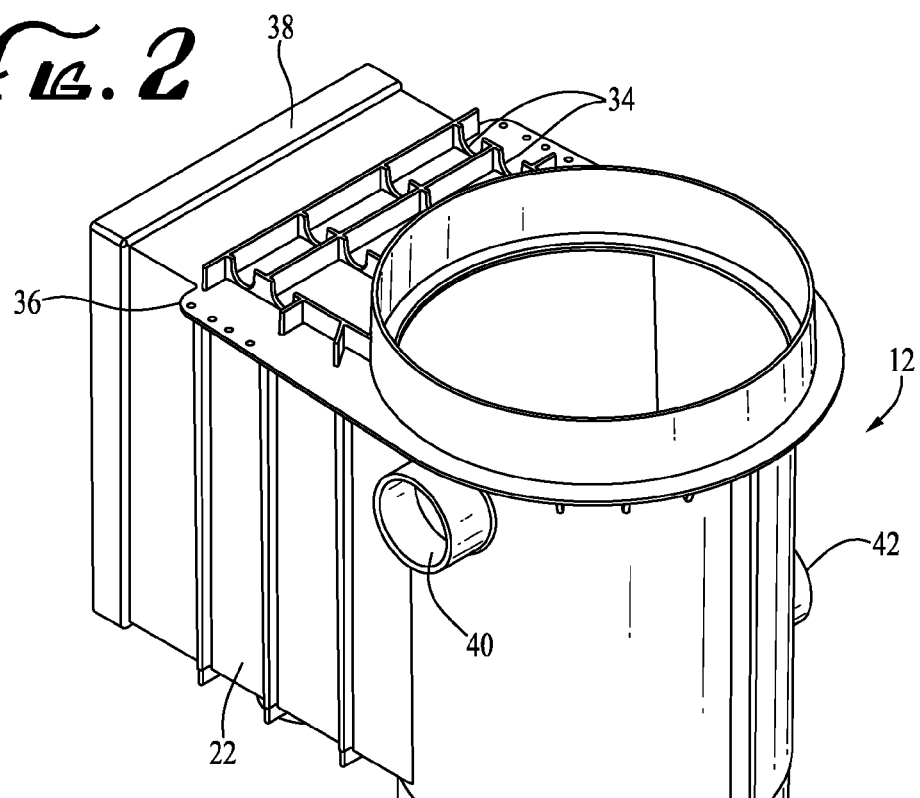
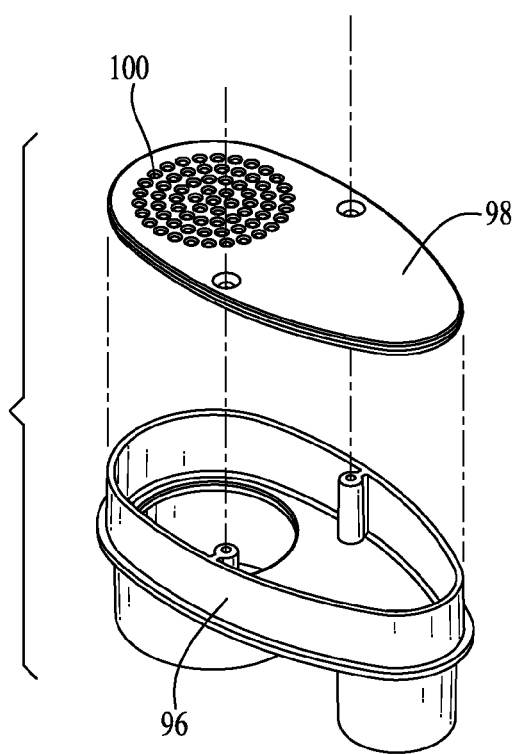

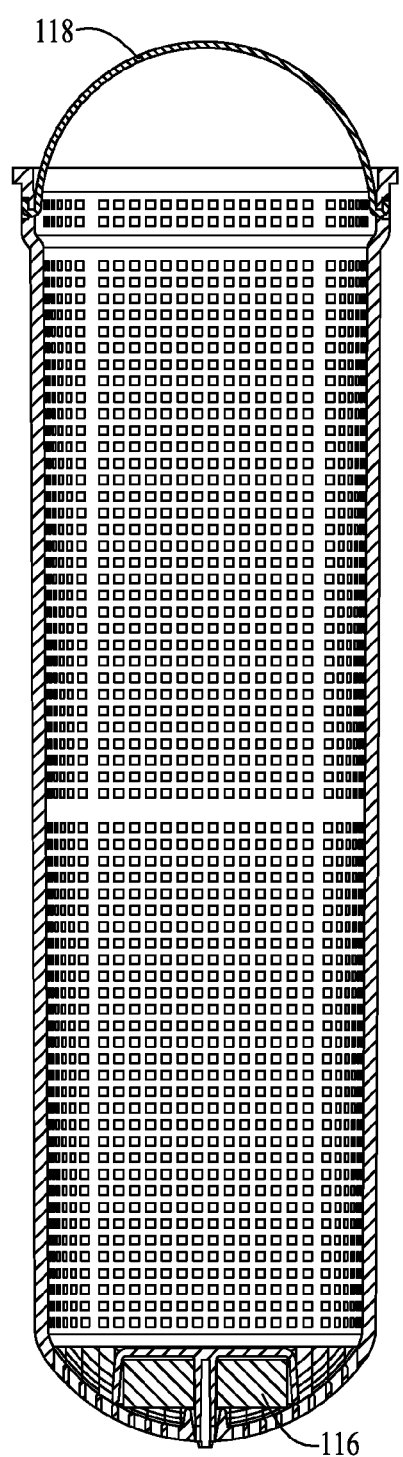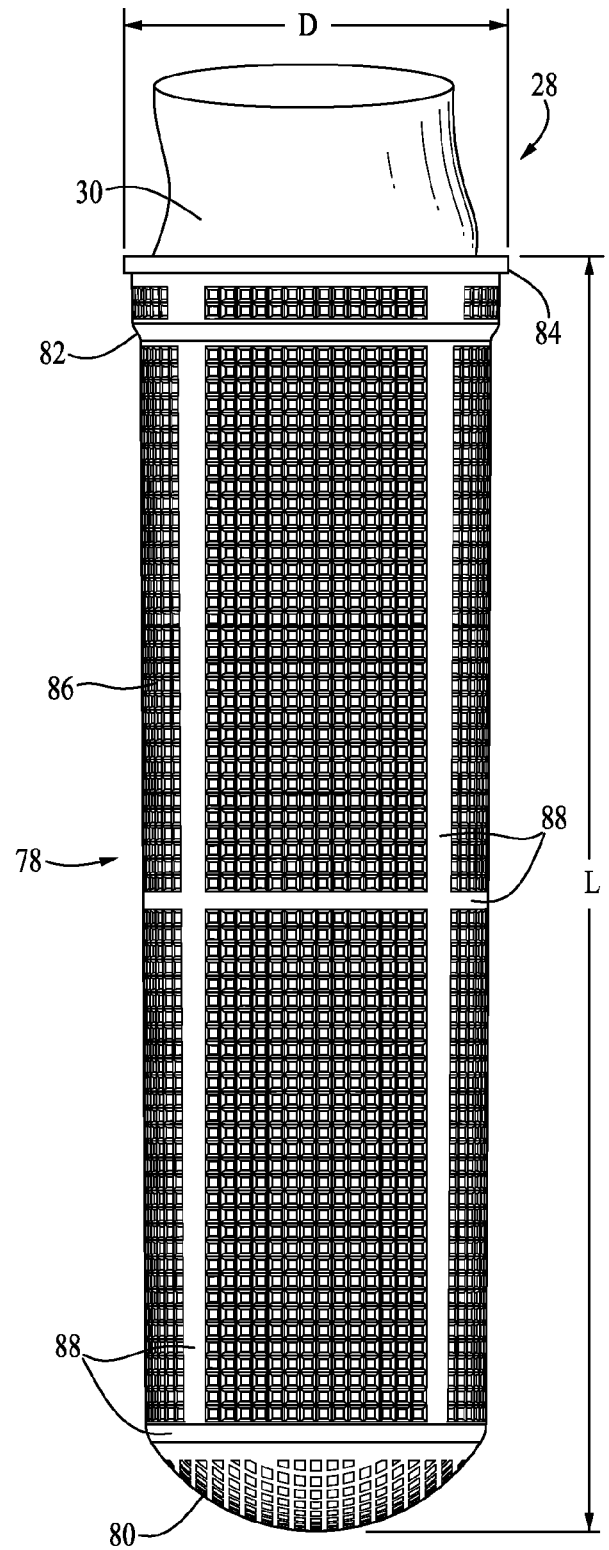
fig.5.1  fig.5.2

ENLARGED POOL FILTERING SYSTEM WITH SKIMMER AND PRE-FILTER

BACKGROUND

Residential and commercial pool filtration systems are known in the art. Typically these systems comprise a skimmer intake with a basket-like trap for retaining large debris such as leaves that flout on the surface of a pool, and a drain intake for pulling water from the bottom of the pool where sediment and other non-floating debris collects. Occasionally, the lines for the skimmer and drain intake merge into a single line which passes through a main pool filter, usually comprising a fine mesh, caked with a filtering media such as diatomaceous earth or cellulose fiber.

Small particulate debris taken in by the drain, and to a lesser extent having passed through the skimmer and trap, is collected by the filter and filtering media, which must be cleaned periodically. Cleaning the pool filter is a labor intensive, messy and water wasting task as it involves rinsing debris from the filter, possibly backwashing the filter, replacing the filter media and rinsing away the debris removed from the filter. In areas where deciduous trees and shrubs are near a pool, the trap must also be frequently emptied, since due to its small size it quickly fills with leaves. By pre-filtering the water with a fine mesh filter, trapping particles as small as 300 microns, before they reach the main pool filter, the main filter can remain in operation for a much longer period of time, clearing the water of even smaller particles. However, fine mesh filters require a large surface area to operate without requiring frequent maintenance due to clogging. Further, since filter/skimmer access portals are preferably small, such that they are inconspicuous and less of a pool-side trip hazard, large-area fine mesh filters cannot be easily fitted or removed through the small access portal.

For these reasons, a filtering apparatus is needed, which provides a more robust skimmer trap or filter and an easily accessible drain line filter adjacent the skimmer, both capable of retaining very small particles. There is also a need for large-sized filters which require only minimal space for access and removal on a pool patio. There is also a need for a filter apparatus incorporating a fill water inlet and an overflow line into the apparatus, and which is also adaptable for incorporating ozone or other purification systems into the skimmer and drain lines. Finally, there is a need for a modular filter apparatus allowing a skimmer pre-filter to be installed by itself, or with a drain line pre-filter as desired.

SUMMARY

A filtering system for a pool containing water and having a pool wall and an adjacent deck is provided. The improved filtering system permits the removal of fine particulate matter from the pool water, while requiring minimal maintenance, cleaning and water usage. The present filtering system permits the use of a large surface area fine mesh filter that can remove particles that are 300 microns and even smaller. The present filter can easily be inserted or removed from a standard filter port found on most pool decks (cement decks, natural material decks like grass or stone decks, and other deck materials used in industry). Thus, the present filter does not disrupt the appearance or safety of the deck adjacent to the pool.

The present filtering system has a vertically elongated inlet housing with a drought tolerant water inlet configured to be in fluid communication with the pool through the wall, with the inlet housing having an access opening configured to be accessed through the deck. Further included is a filter chamber in fluid communication with the inlet housing, where the filter chamber has an outlet. Yet further included is an elongated filter assembly configured to be fitted within the filter chamber, the filter assembly has a length and a diameter, where the length is greater than twice the diameter. The filter assembly includes a porous filter basket removably secured within the filter chamber and a filter bag lining the porous filter basket, where the filter basket provides support for the filter bag. The diameter of the elongated filter assembly is sized to fit through the access opening. In operation, the water is drawn into the inlet housing from the pool and is delivered to the filter chamber. Then, the water is drawn through the filter bag and through the porous filter basket. Thereafter, the water is drawn into the outlet and delivered back to the pool. The water may be directly delivered back to the pool or further conditioned through a remote filtering system, a heating system, or the like.

In an alternative embodiment, the porous filter basket has a cylindrical wall and a domed bottom. The filter bag may have a porosity of three hundred microns or less. Alternatively, the length of the filter assembly may be greater than three times the diameter. Again, alternatively, the length of the filter assembly may be greater than four times the diameter.

To aid in installation of the filtering system during the construction of the pool the inlet housing may include a locator (a slot, ribs, etc.) for positioning a reinforcement bar and a hole for tying the reinforcement bar to the inlet housing. The filter bag may completely covers an inside surface of the porous filter basket. Alternatively, a weir housing may provide the water inlet to the skimmer inlet housing, where the weir housing has an elongated weir door with a float.

In an alternate embodiment, a filtering system for a pool containing water and having a pool wall, a drain, and an adjacent deck is provided. The filtering system includes a skimmer filter with an inlet housing that has a water inlet configured to be in fluid communication with the pool through the wall; a porous filter basket removably secured within a filter chamber, and a filter bag completely lining the porous filter basket, where a length of the porous filter basket is greater than twice a diameter of the porous filter basket. The system further includes a pool drain filter with a drain inlet housing that has a drain water inlet configured to be in fluid communication with the pool through the drain; a drain porous filter basket removably secured within a drain filter chamber; and a drain filter bag completely lining the drain porous filter basket, where a second length of the drain porous filter basket is greater than twice a second diameter of the drain porous filter basket. Yet further included is an equalizer line fluidly connecting the skimmer inlet housing with the drain inlet housing. In operation, the water is drawn from the pool and into the skimmer inlet housing through the water inlet and is delivered to the filter chamber. Then, the water is drawn through the filter bag and through the porous filter basket. Thereafter, the water is drawn into the outlet and delivered back to the pool. Yet further, the water is drawn from the pool and into the drain inlet housing through the drain water inlet and is delivered to the drain filter chamber. Then the water is drawn through the drain filter bag and through the drain porous filter basket. Thereafter, the water is drawn into the drain outlet and delivered back to the pool.

Alternatively, the skimmer inlet housing includes an access opening configured to be accessed through the deck and the drain inlet housing includes a second access opening configured to be accessed through the deck. In this way, the diameter of the porous filter basket is sized to fit through the access opening; and the diameter of the drain porous filter basket is sized to fit through the second access opening. Alternatively, the skimmer filter is structurally connected to the pool drain filter by a stabilizing member. Again alternatively, an ozone bubble plate is configured to introduce ozone into the water through the inlet housing.

BRIEF DESCRIPTION OF THE FIGURES

FIGS. 5.1 and 5.2 are a side view of a filter basket and a side view of a filter basket with a filter bag, respectively.

FIGS. 8-1 and 8-2 are exploded views of the pool filter.

REFERENCE NUMBERS

10. Filter
12. Skimmer Inlet Housing
14. Skimmer Filter Chamber
16. Primary Opening Flange
18. Primary Lid
20. Weir Door
22. Weir Housing
24. Primary Portal
26. Lock Down Ring
28. Skimmer Filter Basket
30. Filter Bag
32. Primary Outlet
34. Slots
36. Holes
38. Face Frame
40. Overflow Outlet
42. Primary Equalizer Port
44. Drain Inlet Housing
46. Drain Filter Chamber
48. Equalizer Line
50. Secondary Equalizer Port
52. Secondary Opening Flange
54. Secondary Lid
56. Secondary Portal
58. Lock Down Cap
60. Optional Vacuum Port
62. Drain Filter Basket
64. Secondary Outlet
66. Water Fill Inlet
68. Drain Inlet
70. Spacer
72. Spacer Ports
74. Stabilizing Pipes
76. Stabilizer Pipe Fitting
78. Cylindrical Wall
80. Dome Cap
82. Lower Lip
84. Upper Lip
86. Mesh Surface
88. Ribs
90. Pool Inlet Fitting
92. Vertical PVC Pipe
94. Ozone Stone
96. Two Port Ozone Adapter
98. Ozone Bubble Plate
100. Perforations
102. PVC Pipe to House Ozone Tubing
104. Clips
106. Weir Door Cap
108. Primary Threaded Collar
110. Secondary Threaded Collar
112. Primary Bag Collar
114. Secondary Bag Collar
116. Zinc Anode
118. Handle

DESCRIPTION

Figure 1:
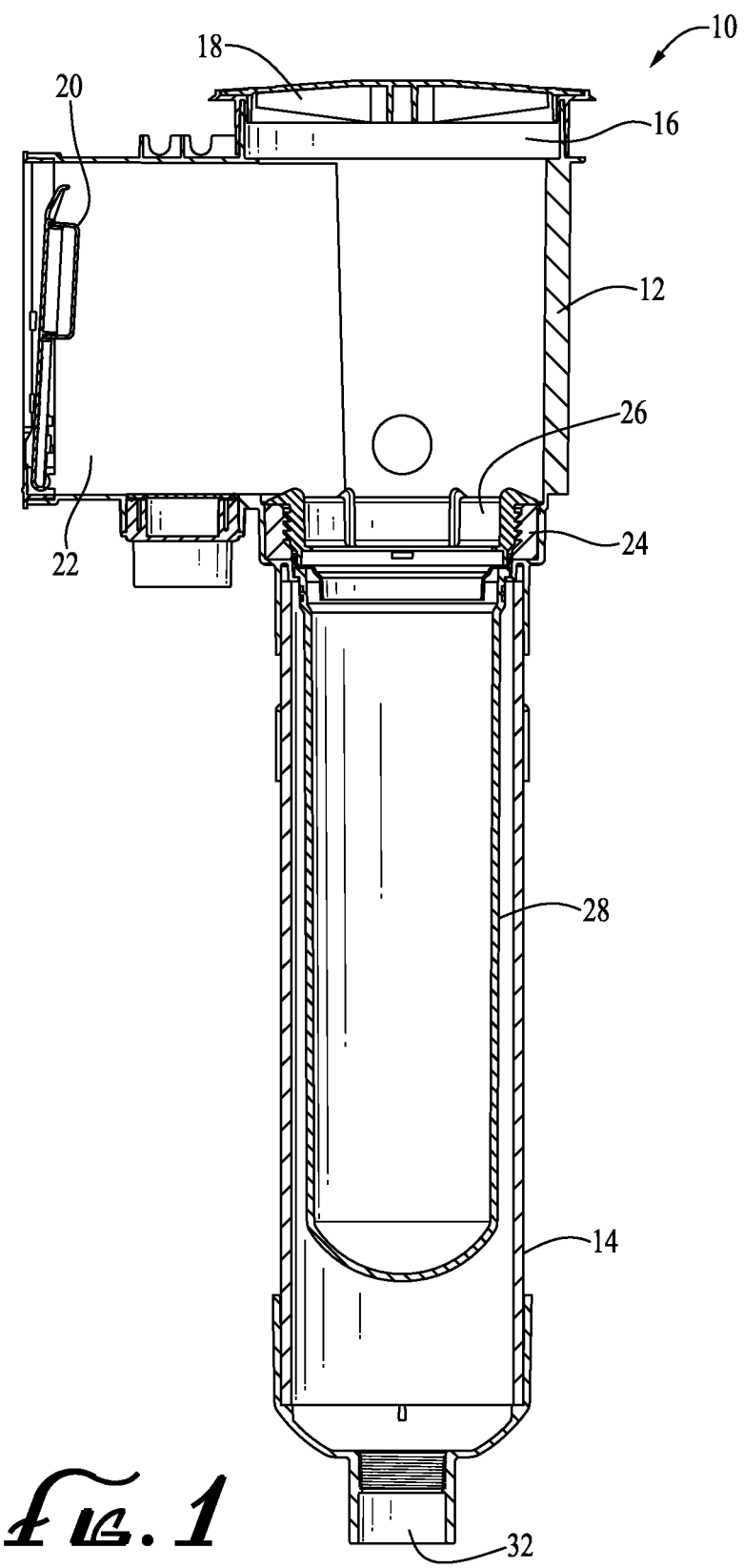
FIG. 1 is a cut-away view of a pool filter having a skimmer inlet.

Referring to FIG. 1, a pool filter 10 has a skimmer inlet housing 12 and a skimmer filter chamber 14. The skimmer inlet housing 12 has a primary opening flange 16 bearing a primary lid 18, preferably at the top of the skimmer inlet housing 12. The skimmer inlet housing 12 also includes a weir door 20, disposed in a weir housing 22, which is generally incorporated into and a part of the skimmer inlet housing 12, and a primary portal 24, which includes a lock down ring 26, acting much like a retaining ring. Because the skimmer inlet housing 12 is vertically elongated, along with the weir door 20, the filter can accommodate a greater span of water levels as evaporation occurs, avoiding the need for refilling the pool frequently.

Still referring to FIG. 1, the skimmer inlet housing 12 is connected to the elongated skimmer filter chamber 14 by the primary portal 24. Preferably, the primary portal 24 is below the weir door 20 to prevent air from entering the pool pump lines (not shown) attached to the filter 10, and is disposed directly below the primary opening flange 16. The skimmer filter chamber 14 includes an elongated skimmer filter basket 28 and a filter bag 30 (not shown in this view) lining the skimmer filter basket 28.

Ideally the primary portal 24 and skimmer filter basket 28 are smaller than the primary opening flange 16 such that with the primary opening flange 16 disposed directly above the primary portal 24, the skimmer filter basket 28 may be easily removed from the filter 10 for cleaning. At the bottom of the skimmer filter chamber 14, a primary outlet 32 leads to the pool pump (not shown). In one embodiment the primary outlet 32 is adapted for two inch suction.

Figures 2, 8:
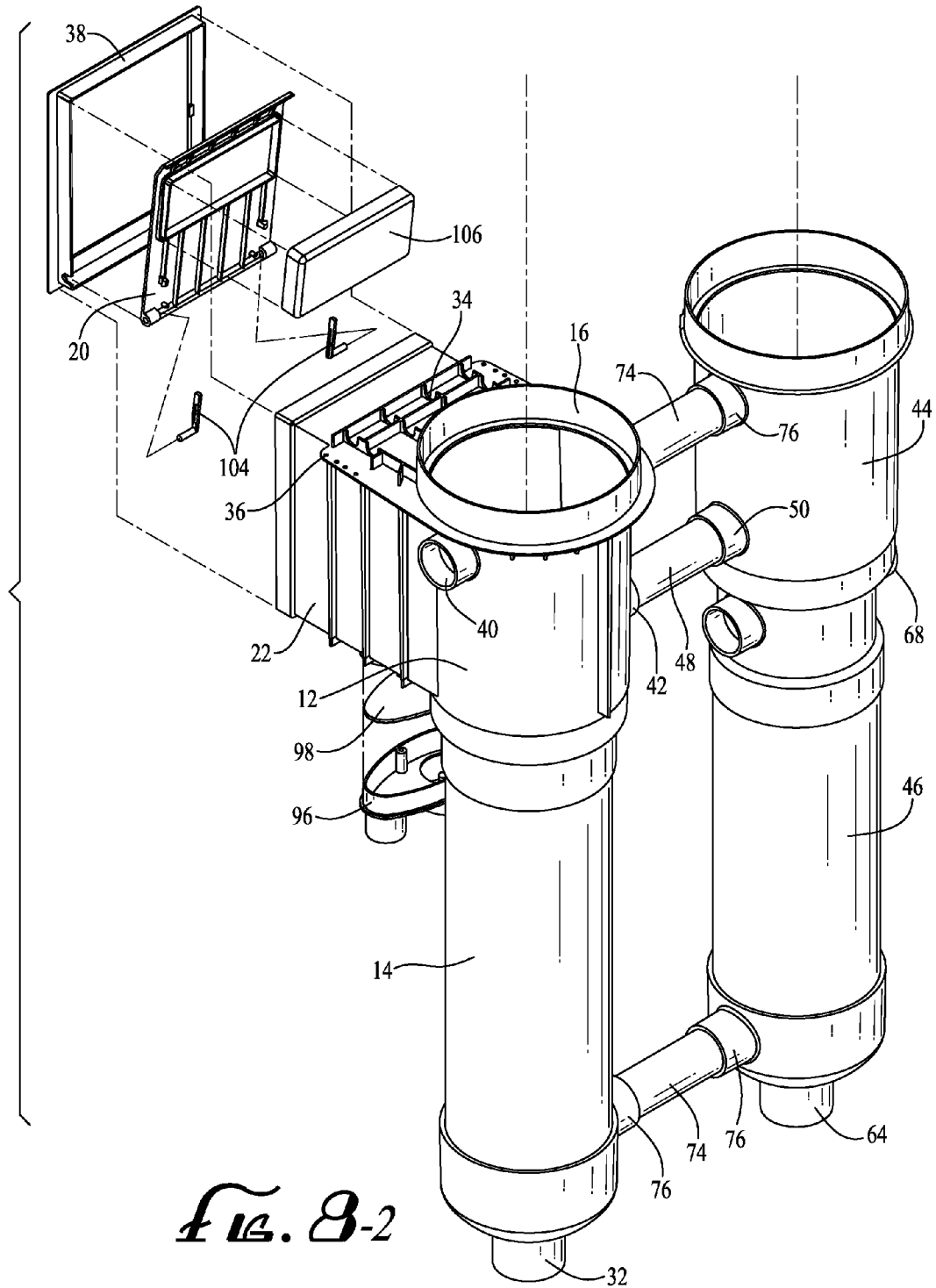
FIG. 2 is a perspective view of a skimmer inlet housing.
FIG. 8 shows the respective orientations of the exploded views shown in FIGS. 8-1 and 8-2.

Referring to FIG. 2, a perspective view of the skimmer inlet housing 12 is shown. To ensure an accurate installation prior to pouring a concrete or similar pool foundation (not shown) the skimmer inlet housing 12 includes slots 34 for rebar (not shown) and holes 36 for wiring the rebar to the skimmer inlet housing 12. Also shown in FIG. 2 is the weir housing 22 which is incorporated as a part of the skimmer inlet housing 12. The weir housing 22 terminates in a face frame 38 which holds the weir door 20 (not shown in this view) in place. The skimmer inlet housing 12 also includes an overflow outlet 40 to prevent pool overflows, and a primary equalizer port 42 for connecting to a drain inlet housing 44 (not shown in this view).

Figure 3:
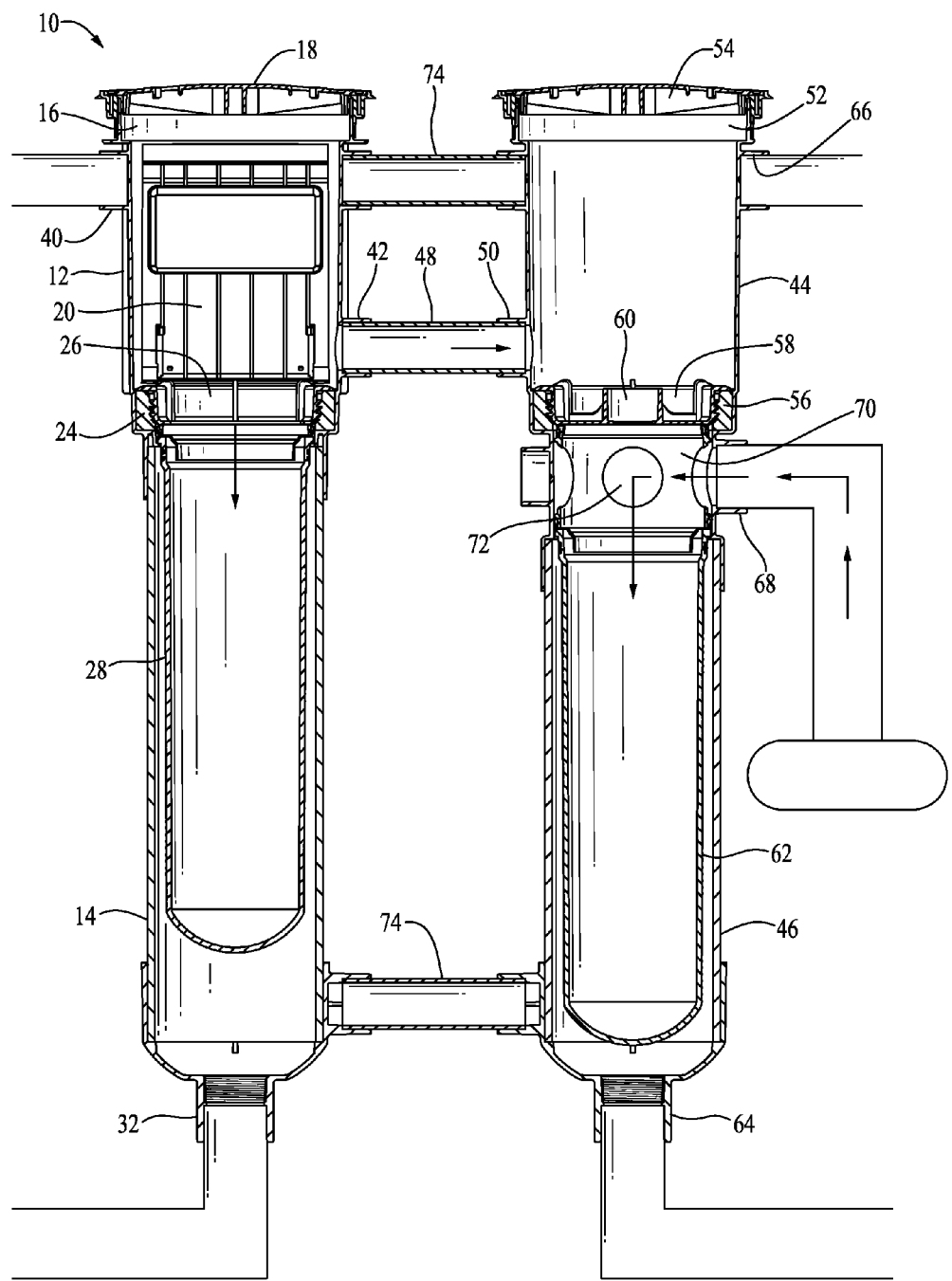
FIG. 3 is a cut-away view of the pool filter having a skimmer inlet and including a drain filter.

Referring to FIG. 3, another embodiment of the filter 10 having both skimming and drain suction functions is shown. In this embodiment, the filter 10 includes the skimmer inlet housing 12 and skimmer filter chamber 14, but also includes apparatus for drain filtration, including a drain inlet housing 44, and a drain filter chamber 46. Notably, in embodiments where only a skimming function is needed, the primary equalizer port 42 will be capped. In embodiments such as the illustrated embodiment, where both skimming and drain suction functions are needed, the primary equalizer port 42 will connect to the drain inlet housing 44 using an equalizer line 48, discussed below, which connects to a secondary equalizer port 50 on the drain inlet housing 44.

Still referring to FIG. 3, the drain inlet housing 44 has a secondary opening flange 52 bearing a secondary lid 54, preferably at the top of the drain inlet housing 44. The drain inlet housing 44 also includes a secondary portal 56, which includes a lock down cap 58. The lock cap 58 may include an optional vacuum port 60 for easily attaching a pool vacuum hose (not shown). The lock down cap 58 may also be exchanged for the lock down ring 26 for vacuuming through the skimmer inlet housing 12.

Still referring to FIG. 3, like the skimmer inlet housing 12, the drain inlet housing 44 includes a secondary portal 56 disposed directly below the secondary opening flange 52. An elongated drain filter chamber 46 includes a drain filter basket 62 lined with a filter bag 30 (not shown in this view). Also, like the skimmer inlet housing 12, the secondary portal 56 and drain filter basket 62 are smaller than the secondary opening flange 52 such that with the secondary opening flange 52 disposed directly above the secondary portal 56, the drain filter basket 62 may be easily removed from the filter 10 for cleaning. At the bottom of the drain filter chamber 46, a secondary outlet 64, preferably adapted for two-inch suction leads to the pool pump (not shown).

Still referring to FIG. 3, the drain inlet housing 44 includes a water fill inlet 66, allowing it to connect to a water source (not shown) for re-filling a pool (not shown) as water evaporates. At the bottom of the drain inlet housing 44, a drain inlet 68 allows water from a main drain line (not shown) to enter the drain inlet housing 44 and proceed to the drain filter basket 62. To account for the extra space taken up by the drain inlet 68, a spacer 70 may be included between the lock down cap 58 and drain filter basket 62. In one embodiment, the spacer 70 may include spacer ports 72 for closing off the drain inlet 68.

Figure 4:
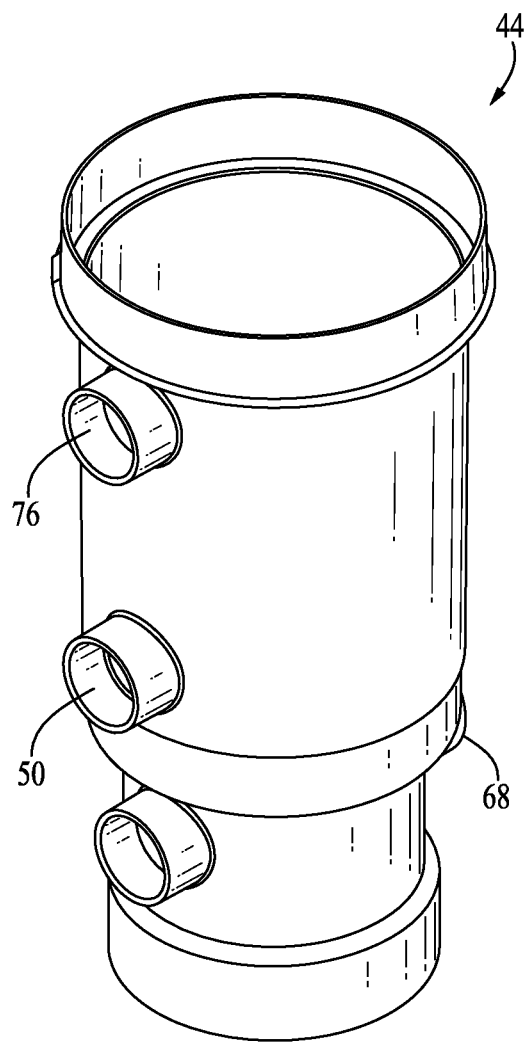
FIG. 4 is a perspective view of a drain filter housing.

Still referring to FIG. 3, stabilizing pipes 74 are disposed between the skimmer inlet housing 12 and drain inlet housing 44, and the skimmer filter chamber 14 and drain filter chamber 46, linking and holding them firmly together. There is no water flow between the stabilizing pipes 74. The equalizer line 48 which connects the skimmer inlet housing 12 and drain inlet housing 44 also helps anchor them together. The purpose of the equalizer line 48 is to maintain the water level in the drain inlet housing 44, thereby preventing a loss of prime if the pool drain (not shown) becomes obstructed. FIG. 4 shows a perspective view of the drain inlet housing 44, including a stabilizer pipe fitting 76, drain inlet 68 and secondary equalizer port 50.

Referring to FIGS. 5.1 and 5.2, the elongated nature of the filter assembly is shown, with a filter basket 28 lined by a filter bag 30 (FIG. 5.2). The skimmer filter basket 28, which as mentioned may be identical to the drain filter basket 62 (not shown) for economy, comprises an elongated basket structure to maximize the surface area of the skimmer filter basket 28 and provide for longer filter runs, avoiding the need for frequent filter backwashing or full-scale cleaning. In the illustrated embodiment, the skimmer filter basket 28 includes a cylindrical wall 78 with a dome cap 80. At the top of the skimmer filter basket 28, a lower lip 82 and upper lip 84 are disposed for engaging the primary portal 24, and preventing the skimmer filter basket 28 from being drawn into the skimmer filter chamber 14.

The elongated filter assembly has a length dimension L that is substantially greater than the diameter dimension D. The ratio of length L to diameter D should be at least 2:1. The ratio can be increased depending on filtered water flow characteristics and the quantity of particles within the water. For example, for higher flow rates and greater quantities of particulates, the length L can vary from twice the diameter D to five times or greater the diameter D. In the example embodiment illustrated in FIG. 5, the length L is greater than three times the diameter D. In this way, maximum filtering area is achieved while the diameter D is sufficiently small to fit through the primary opening flange 16.

Still referring to FIG. 5, the skimmer filter basket 28 has a mesh surface 86 covering the cylindrical wall 78, dome cap 80 or bottom, and even extending into an area between the lower lip 82 and upper lip 84. Since the mesh surface 86 is typically weaker than a solid surface, ribs 88 are incorporated into the skimmer filter basket 28, running along its length and around its circumference. A filter bag 30, in one embodiment capable of filtering to 300 microns or less, is adapted to fit inside the skimmer filter basket 28, and pulled against the mesh surface 86 under suction. Referring specifically to FIG. 5.1, the skimmer filter basket 28 ideally also includes a zinc anode 116 for electrolysis to preserve metal filter components, and a handle 118 for easily removing the skimmer filter basket 28 when cleaning is occasionally necessary.

Figure 6:
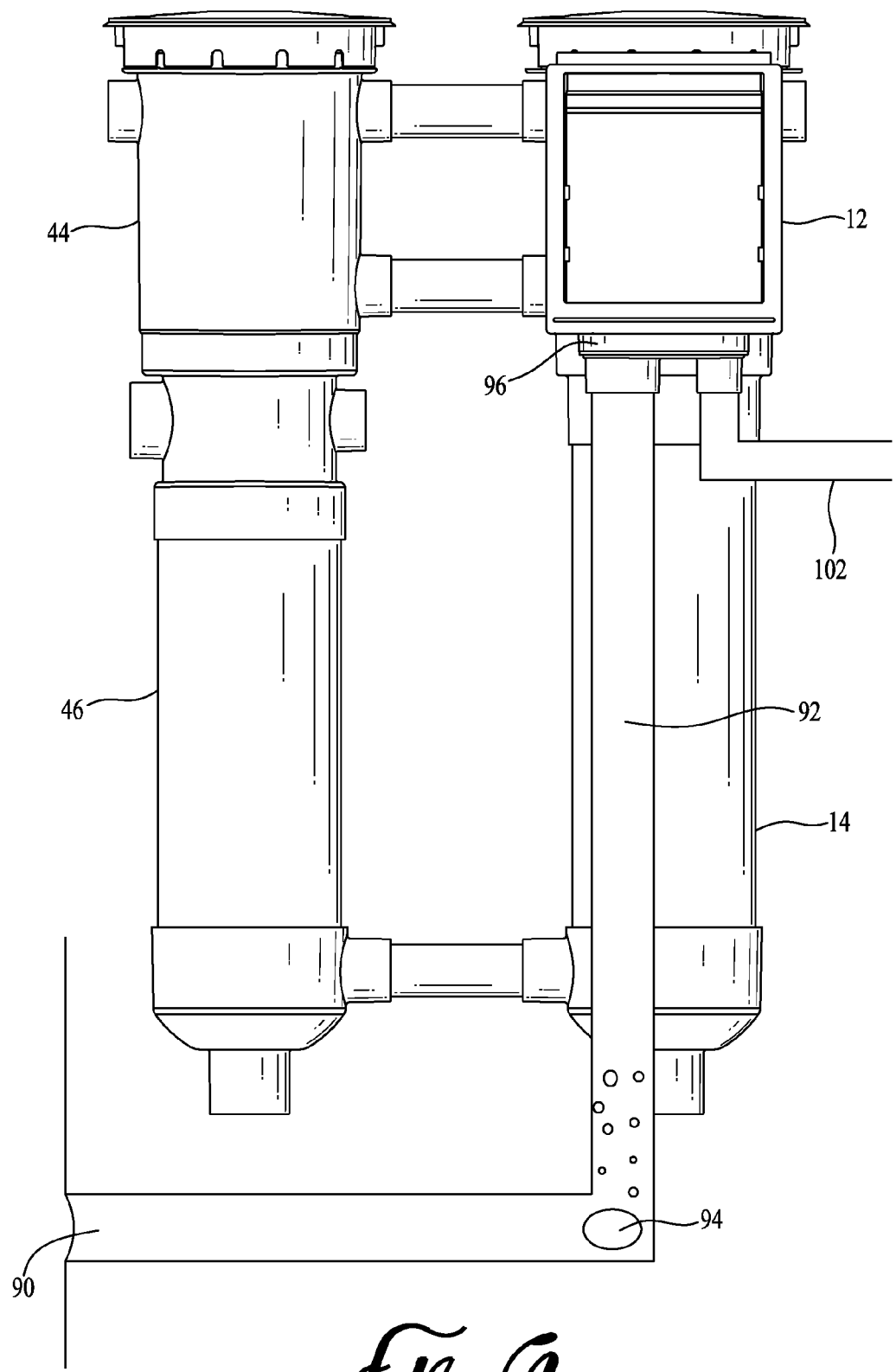
FIG. 6 is a side view of the pool filter including a two-port adapter for an ozone system.

Referring to FIG. 6, in some embodiments, the filter 10 may also be equipped to incorporate an ozone unit (not shown). In this configuration, a pool inlet fitting 90, preferably about 1½ inches in diameter, leads to a vertical PVC pipe 92, also preferably about 1½ inches in diameter. An ozone stone 94 is placed at the bottom of the vertical PVC pipe 92, and connected to an ozone source (not shown). A customary connection might incorporate ¼ inch flexible tubing. The top of the vertical PVC pipe 92 terminates in a two port ozone adapter 96 incorporated into the bottom of the skimmer inlet housing 12.

Figure 7:
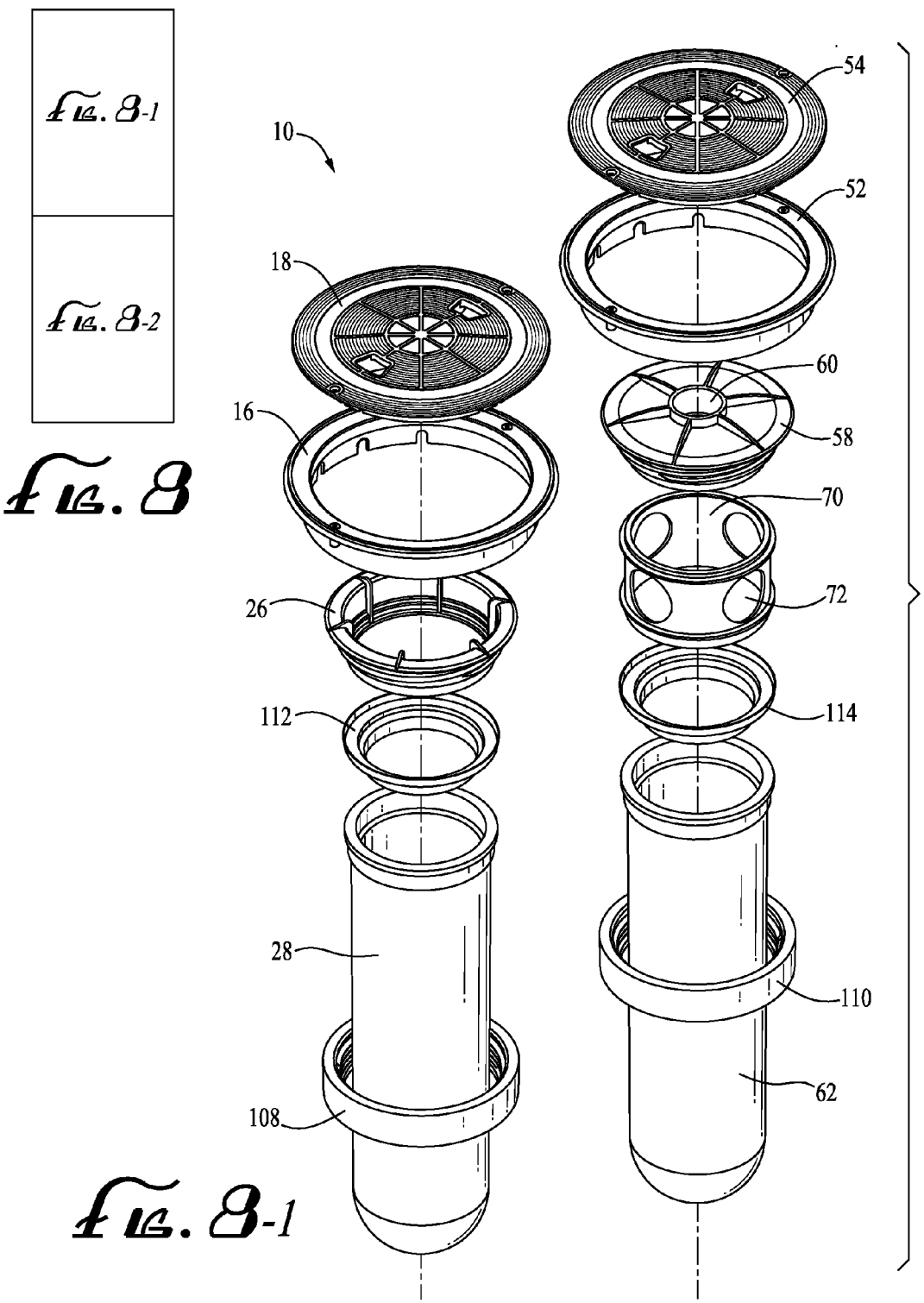
FIG. 7 is an exploded perspective view of the two-port adapter having an ozone bubble plate.

Referring to FIG. 7, a perspective view of the two port ozone adapter 96 is shown along with an ozone bubble plate 98. The bubble plate 98 includes perforations 100 which allow ozone-bearing water and ozone gas to rise through the vertical PVC pipe 92 and enter the skimmer inlet housing 12 where it can mix with and purify water being drawn through the filter 10. Referring to FIGS. 6 and 7, preferably, a one inch PVC pipe to house ozone tubing 102 also connects to the two port ozone adapter 96, providing a path for the flexible ozone tubing (not shown) from the skimmer inlet housing 12 back to the ozone unit (not shown). By constructing the one inch PVC pipe to house ozone tubing 102 to be higher than the overflow outlet 40 in the skimmer inlet housing 12, (Hartford loop) the amount of water in the ozone tubing is minimized.

Referring to FIG. 8, an exploded view of a filter 10 is shown. In this view, the components of the weir door 20 are shown. The enlarged weir housing 22 extends from the skimmer inlet housing 12 and is large enough to allow the weir door 20 to swing approximately ninety degrees without obstruction. Clips 104 incorporated into the weir door 20 and weir housing 22 create a hinged connection. To ensure that the weir door 20 remains near the surface of the water, a weir door cap 106 is placed on the weir door 20 with an air-tight seal, thereby creating a float. The face frame 38 covers the weir door 20 to engage the surface of a pool (not shown).

Still referring to FIG. 8, the skimmer filter basket 28 and drain filter basket 62 each nest in a primary threaded collar 108 and secondary threaded collar 110, respectively. The primary threaded collar 108 engages the lock down ring 26 to anchor the skimmer filter basket 28 in place, and the secondary collar 110 engages the lock down cap 58 to anchor the drain filter basket 62 in position. Also shown are a primary bag collar 112 which is sandwiched between the lock down ring 26 and the upper lip 84 of the skimmer filter basket 28, and a secondary bag collar 114 sandwiched between the spacer 70 and the upper lip 84 of the drain filter basket 62.

METHOD OF OPERATION

In order to use the pool filter 10, a user will first decide whether only skimming activity is needed or both skimming and draining. While the pool filter 10 is designed modularly, such that skimming-only installations (discussed below) are possible, for purposes of illustration, a complete skimming and drain pool filter is discussed.

Installation of the pool filter 10 ideally occurs during construction of a swimming pool. After the pool has been designed and excavated, the skimmer inlet housing 12 is placed in the desired position adjacent the side of the pool. To ensure an accurate installation, prior to pouring the pool foundation rebar will be attached to the skimmer inlet housing 12 using the slots 34 and wire wrapped around the rebar and through the holes 36 to hold the skimmer inlet housing 12 in place.

The weir housing 22 extends from and is incorporated into the skimmer inlet housing 12. With the skimmer inlet housing 12 in place, the weir housing 22 and its face frame 38 which holds the weir door 20 in place will be disposed at the edge of the pool wall. By masking the face frame 38, the area around it can be plastered or tiled as desired, once the foundation is poured.

Prior to pouring the foundation, however, the drain inlet housing 44 will be connected to the skimmer inlet housing 12. Also, for stability, the drain filter chamber 46 depending from the drain inlet housing 44 will be attached to the skimmer filter chamber 14 which depends from the skimmer inlet housing 44. Both attachments may be accomplished using the stabilizing pipes 74. An additional attachment between the skimmer inlet housing 12 and drain inlet housing 44 is the equalizer line 48, which adds stability, although that is not its primary purpose.

Additional attachments that may be necessary before pouring the pool foundation include the overflow outlet 40, if desired, from the skimmer inlet housing 12 to a suitable overflow source, a water source attaching to the water fill inlet 66 to provide a way of refilling the pool out-of-sight, attaching a main drain line coming from the drain at the bottom of the pool to the drain inlet 68, and most importantly, attaching the primary outlet 32 from the skimmer filter chamber 14 and secondary outlet 64 from the drain filter chamber 46, both of which lead to the pump which drives debris into the pool filter 10.

Other attachments may include connecting the two port ozone adapter 96 and bubble plate 98 to the skimmer inlet housing, and connecting a pool inlet fitting 90 to the vertical PVC pipe 92 for ozonation. An ozone stone 94 is placed in the vertical PVC pipe 92 with a line running through the PVC pipe to house ozone tubing 102 to an ozone source. Ideally, the ozone source may be installed near the pump or in an adjacent out-of-the-way place.

With all of the attachments in place, the pool foundation poured, and the pool plastered and/or tiled as desired, the pool filter 10 may commence operation.

When the pump is activated, suction draws water out of the primary outlet 32 and secondary outlet 64. Water is consequently drawn into the skimmer inlet housing 12 through the weir door 20 and weir housing 22. And water is drawn into the drain inlet housing 44 through the drain inlet 68. The equalizer line 48 ensures water on top of the lock down cap 58 to prevent loss of prime in the drain inlet housing 12.

Water travels through the primary portal 24 and spacer 70, into the skimmer filter chamber 14 and drain filter chamber 46, respectively. There, it is drawn through the skimmer filter basket 28 and drain filter basket 62, and through the filter bags 30 lining them. Any debris, from leaves drawn in by the skimmer to small particulates drawn in from the drain are retained in the filter bags, which may have a porosity of 300 microns or smaller.

Since the skimmer filter basket 28 and drain filter basket 62 are extremely elongated, they may collect substantial debris before any measurable drop in performance is detected. Furthermore, since the skimmer inlet housing 12 may draw in more debris than the drain inlet housing 44, the skimmer filter basket 28 may be easily removed and cleaned independently of the drain filter basket 62.

To clean the skimmer filter basket 28, a user simply opens the primary lid 18, thereby gaining access to the skimmer filter chamber 12. Reaching down through the skimmer filter chamber 12, the user unlocks the lock down ring 26, perhaps by rotating a threaded connection, removes the lock down ring 26 and draws the skimmer filter basket 28 and attendant filter bag 30 from the skimmer filter chamber 14. A similar action is used to clean the drain filter basket 62 by accessing it through the secondary lid 54, unlocking the lock down cap 58, and removing the spacer 70 if necessary.

Once debris from the filter bags 30 has been discarded and new or perhaps cleaned filter bags 30 installed, the skimmer filter basket 28 and drain filter basket 62 are inserted into the skimmer filter chamber 14 and drain filter chamber 46, and locked in place. During this process, suction from the pump, prevents the filter bags 30 from floating out of the baskets 28, 62.

As the pool filter 10 operates, ozone from an ozone source may be pumped through the PVC tube, through the two port ozone adapter 96 and down to an ozone stone 94 at the bottom of the vertical PVC pipe 92. Ozone bubbles through the ozone stone 94, rising, and with the intake action of the weir housing 22, drawing pool water through the pool inlet fitting 90. The ozone bubbles, travelling through the vertical PVC pipe and bubble plate 98, act to disinfect the water, killing microorganisms.

On occasion, manual vacuuming of the pool may be desired. This is easily accomplished using the optional vacuum port 60 in the lock down cap 58. If maximum vacuum suction is desired, a user can stop the flow through the drain inlet 68. In such an arrangement, water from the equalizer line still travels into the drain filter chamber 46, thereby preventing air in the system and a loss of prime.

An automatic water fill system is contemplated. If an automatic water fill is not available or malfunctions, the weir housing 22 is designed to accommodate a six-inch weir door 20, which will allow up to six inches of evaporation before the pool filter 10 ceases to operate. Likewise, if the water fill system malfunctions and remains on, the overflow outlet 40 in the skimmer inlet housing 12 prevents the pool from overflowing.

In an installation where drain filtering is not necessary, the stabilizing pipes 74 may be omitted, and the primary equalizer port 42 capped. In this manner, the skimmer inlet housing 12 and skimmer filter chamber 14 work alone to pre-filter the pool. In such an instance, a water fill inlet 66 may be included on the skimmer inlet housing 12 along with the overflow outlet 40. In this manner, the filling and overflowing, manual vacuuming, and ozone saturation functions can still be performed.

Since the pool filter 10 with regular cleaning will prevent the intrusion of particulate matter over 300 microns into the main pool filter, it is anticipated using the pool filter 10 will avoid the necessity of cleaning a main filter, greatly reducing the cleaning cycle.

What is claimed is:

1. A filtering system for a pool containing water and having a pool wall and an adjacent deck, the filtering system comprising:
   an inlet housing with a water inlet configured to be in fluid communication with the pool through the wall, the inlet housing having an access opening configured to be accessed through the deck;
   the inlet housing including a locator for positioning a reinforcement bar and a hole for tying the reinforcement bar to the inlet housing;
   a filter chamber in fluid communication with the inlet housing, the filter chamber having an outlet; and
   an elongated filter assembly configured to be fitted within the filter chamber, the filter assembly having a length and a diameter, the length being greater than twice the diameter, the filter assembly comprising:
      a porous filter basket removably secured within the filter chamber; and
      a filter bag lining the porous filter basket, the filter basket providing support for the filter bag;
   wherein the diameter of the elongated filter assembly is sized to fit through the access opening;
   and wherein the water is drawn into the inlet housing from the pool and is delivered to the filter chamber, then the water is drawn through the filter bag and through the porous filter basket, thereafter the water is drawn into the outlet and delivered back to the pool.

2. The filtering system of claim 1 wherein the porous filter basket has a cylindrical wall and a domed bottom.

3. The filtering system of claim 1 wherein the filter bag has a porosity of three hundred microns or less.

4. The filtering system of claim 1 wherein the length of the filter assembly is greater than three times the diameter.

5. The filtering system of claim 1 wherein the length of the filter assembly is greater than four times the diameter.

6. The filtering system of claim 1 wherein the filter bag completely covers an inside surface of the porous filter basket.

7. The filtering system of claim 1 wherein a weir housing provides the water inlet to the inlet housing, the weir housing having a vertically elongated weir door with a float.

8. A filtering system for a pool containing water and having a pool wall, a drain, and an adjacent deck, the filtering system comprising:
   a skimmer filter having an inlet housing with a water inlet configured to be in fluid communication with the pool through the wall, a porous filter basket removably secured within a filter chamber, and a filter bag completely lining the porous filter basket, where a length of the porous filter basket being greater than twice a diameter of the porous filter basket; and
   a pool drain filter having a drain inlet housing with a drain water inlet configured to be in fluid communication with the pool through the drain, a drain porous filter basket removably secured within a drain filter chamber, and a drain filter bag completely lining the drain porous filter basket, where a second length of the drain porous filter basket being greater than twice a second diameter of the drain porous filter basket; and
   an equalizer line fluidly connecting the inlet housing with the drain inlet housing;
   wherein the water is drawn from the pool and into the inlet housing through the water inlet and is delivered to the filter chamber, then the water is drawn through the filter bag and through the porous filter basket, thereafter the water is drawn into the outlet and delivered back to the pool;
   and wherein the water is drawn from the pool and into the drain inlet housing through the drain water inlet and is delivered to the drain filter chamber, then the water is drawn through the drain filter bag and through the drain porous filter basket, thereafter the water is drawn into a drain outlet and delivered back to the pool.

9. The filtering system of claim 8 wherein the filter bag and the drain filter bag each have a porosity of three hundred microns or less.

10. The filtering system of claim 8 wherein the inlet housing includes an access opening configured to be accessed through the deck, and the drain inlet housing includes a second access opening configured to be accessed through the deck; wherein the diameter of the porous filter basket is sized to fit through the access opening; and wherein the diameter of the drain porous filter basket is sized to fit through the second access opening.

11. The filtering system of claim 8 wherein the skimmer filter is structurally connected to the pool drain filter by a stabilizing member.

12. The filtering system of claim 8 wherein an ozone bubble plate is configured to introduce ozone into the water through the inlet housing.

13. The filtering system of claim 8 further comprising an elongated weir housing and weir door.

14. A filter for a pool containing water and having a pool wall and an adjacent deck, the filter comprising:
   and inlet housing having a water inlet in communication with the pool through the pool wall, the inlet housing having an opening accessed through the deck, the inlet housing also having a locator for positioning a reinforcement bar, and a hole for tying the reinforcement bar to the inlet housing;
   a filter chamber in communication with the inlet housing, the filter chamber having an outlet;
   an elongated porous filter configured to substantially fill the filter chamber;
   wherein the elongated porous filter fits through the opening; and
   wherein the water is drawn through the inlet housing to the filter chamber, through the elongated porous filter, and through the outlet for delivery to the pool.

* * * * *